Sept. 3, 1940.  J. M. WILKINS  2,213,789
COMBINED REGULATOR AND RELIEF VALVE
Filed April 15, 1938
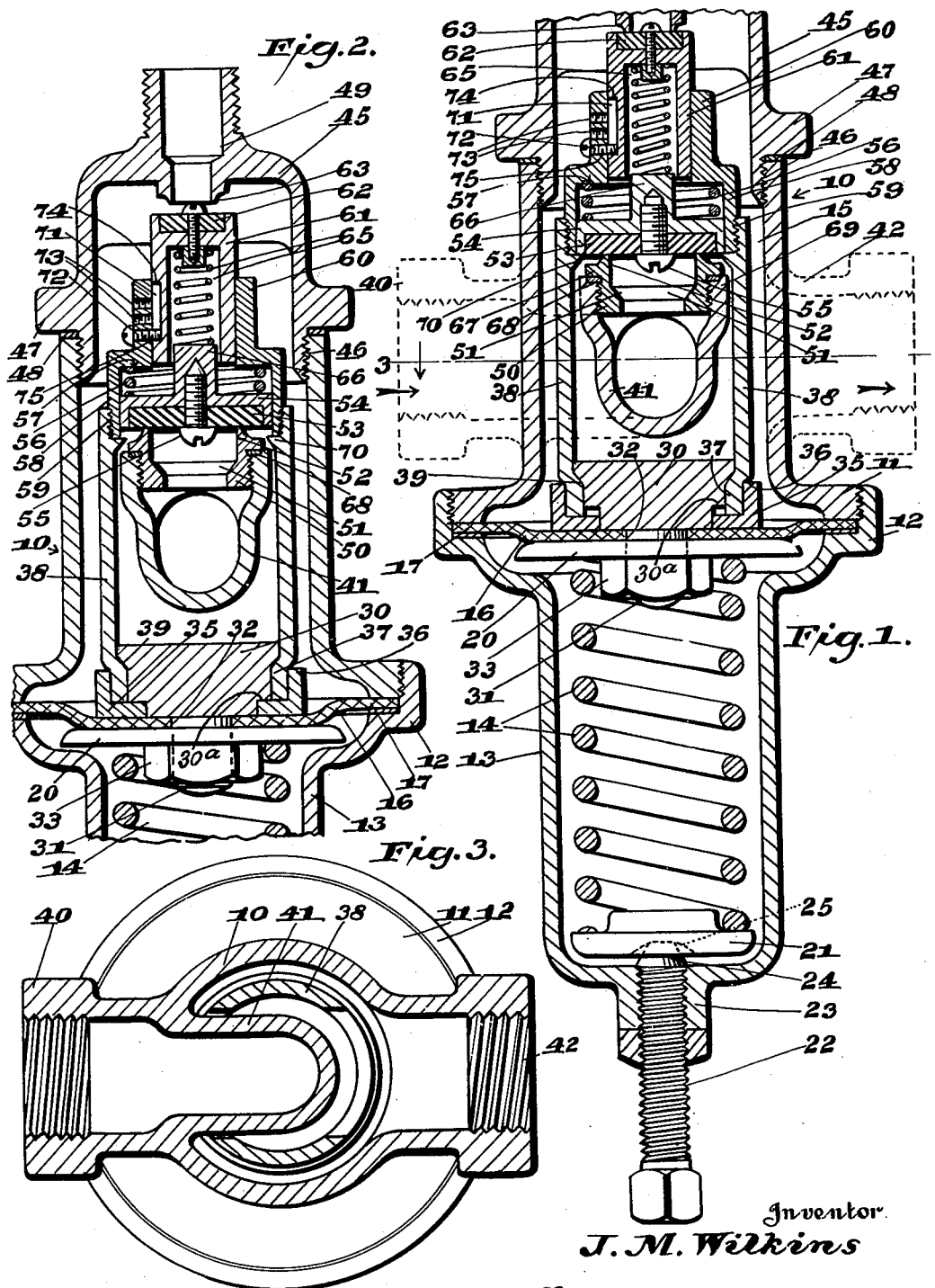

Patented Sept. 3, 1940

2,213,789

UNITED STATES PATENT OFFICE 2,213,789

COMBINED REGULATOR AND RELIEF VALVE

James M. Wilkins, Morrisonville, Ill.

Application April 15, 1938, Serial No. 202,336

3 Claims. (Cl. 50—23)

This invention relates to a combined regulator and relief valve.

An object of the invention is the provision of a device in which a housing is divided by a diaphragm into a compartment for a pressure spring and a compartment for a combined relief valve and regulator, a spring acting against the diaphragm for maintaining a predetermined pressure in the other compartment and for maintaining a supply valve in open position with resilient means between the supply valve and the relief valve tending to close the supply valve until the pressure within the compartment housing the relief valve rises above a predetermined degree, the relief valve being opened by the diaphragm after the supply valve has closed and when the pressure rises after the closing of said supply valve.

A further object of the invention is the provision of a combined regulation and relief valve controlling fluids passing through a line, said relief valve being opened by an auxiliary spring after the pressure in the regulator has passed beyond a predetermined degree and after a valve has been closed which controls the flow of fluid through the line.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a vertical section of the combined regulator and relief valve showing the relief valve and fluid control valve closed, Figure 2 is a fragmentary vertical section showing the relief valve in open position and operated by a diaphragm, and Figure 3 is a horizontal section taken along the line 3—3 of Fig. 1.

Referring more particularly to the drawing, 10 designates a section of a housing which encloses a relief valve and which has a flanged threaded connection at 11 with an enlargement 12 on a section 13 which forms a compartment for a pressure spring 14. The section 10 forms a compartment 15 for the relief valve as will be presently explained.

The two compartments are separated by a flexible diaphragm 16 which is clamped at 17 between portions 11 and 12, respectively, of the sections 10 and 13 of the housing.

A spring 14 has its upper end in engagement with a plate 20 while the lower end is supported by a cup 21. A bolt 22 is threaded into a boss 23 formed on the lower end of the section 13 and this bolt has its inner end, as shown at 24, in engagement with an indented portion 25 of the cup 21. When the bolt 22 is screwed inwardly of the section 13 it will place greater tension on the spring 14 while reverse rotation of the bolt will relieve tension on said spring.

A head or bridging member 30 has a threaded stud 31 projecting through an opening 32 of the diaphragm 16 and also through the plate 20. A nut 33 draws the shoulder of the member 30 up tight against one face of the diaphragm while drawing the upper face of the plate 20 against the underface of said diaphragm so that the member 30 is rigidly secured to the diaphragm.

A ring 35 engages the outer face of the diaphragm 16 and is provided with an upstanding annular flange 36. The head 30 has an undercut shoulder 30a which engages the outer face of the ring 35 so that when the nut 33 is drawn up tight the plate 20, the diaphragm 16, the ring 35 and the head 30 will be securely connected together.

The lower free ends 37 of the upstanding arms 38 of a yoke are offset laterally from the arms and these offset portions are received between the shoulder 39 on the head 30 and the upper free edge of the flange 36. When the nut 33 is drawn up tight the portions 37 of the arms 38 are held against movement.

By this construction the parts just described may be readily disassembled or assembled.

An inlet pipe 40 is adapted to connect the section 10 with a source of fluid under pressure at the central portion of said section as shown by the member 41. An outlet pipe 42 is connected to the section 10 at a point which is diametrically opposite from the inlet pipe 40.

A cap 45 has a threaded connection at 46 at the upper end of the section 10 and a shoulder 47 on said cap clamps a washer 48 to the upper end of the section and seals the section from the loss of fluid at this point. The cap is provided with an outlet passage 49 through which fluid is adapted to flow when the pressure exceeds a predetermined degree within the section 10.

A pipe 41 is provided at its upper portion with a threaded plug 50 which has a passage 51 to permit fluid from the pipe 41 to enter the compartment 15 of the section 10. The upper end of the plug 51 is provided with an annular seat 52 for a valve 53. A cup-shaped member 54 receives the valve 53 and a bolt 55 maintains the valve within the cup-shaped member.

A spring 56 has one end resting upon the top of the cup-shaped member 54 while the upper end engages a shoulder 57 formed in a cylinder 58 which has a threaded connection with a ring 59 formed integrally with the upper ends of the arms 38.

The reduced portion 60 of the cylinder 58 receives a piston 61 which has a relief valve 62 at its upper end engaging a seat 63 formed on a boss which embraces the passage 49 in the cap 45.

A spring 65 which is weaker than the spring 56 engages the inner portion of the piston 61 while the opposite end of the spring rests upon a boss 66 formed on the upper end of the valve carrier 54. The spring 65 operates to maintain the valve 62 upon the upper end of an enlarged portion 69 of the pipe 41.

It will be noted that each of the arms 38 is provided with a shoulder 70 which supports and limits the inward movement of the member 58. These shoulders also engage the cup-shaped member 54 for limiting the downward movement of said member when the valve 53 is resting upon a seat 52.

The cylinder 61 is provided with a vertical slot 71 which receives the inner end of a threaded bolt 72 which is screwed into one of the passages 73 formed in the side wall of the cylinder 60 so that when the opposite ends of the shoulders 74 or 75 engage the inner end of the bolt 72 the piston will be limited in its reciprocating movement towards or away from the valve seat 63.

It will be seen by this construction that when the cap 45 is removed the entire assembly of the valves and their appurtenances may be removed through the upper open end of the section 10. The remaining parts may be removed when the section 10 is unthreaded from the section 13.

The operation of my device is as follows: Fluid enters the pipe 40 and likewise the compartment 15 and acts on the diaphragm 16 in the compartment 15. The pressure on the spring 14 has been regulated by the threaded bolt 22 so that as the fluid enters the pipe 40 at 200 lbs. pressure there will be 40 lbs. resistance by the spring in this particular instance although higher or lesser pressures can be maintained by said spring by a regulation of the bolt. The spring 14 maintains the diaphragm 16 in a predetermined position so that the yoke or arms 38 will maintain the valve 53 off of its seat 52 so that fluid from the inlet member 41 may enter the compartment 15 and pass out through the outlet 42. The relief valve 62, however, is maintained upon its seat by action of the small spring 65.

If for some reason the pressure within the compartment 15 will be increased the diaphragm 16 will be lowered against the tension of the spring 14 as shown in Fig. 2 and the valve 53 will be forced upon its seat 52 closing off the supply of the fluid to the compartment 15.

The spring 56 tends to maintain the valve 53 on the seat 52 but the pressure of this spring is overcome by the pressure of the fluid from the pipe 40.

Under abnormal conditions the pressure will increase in the compartment 15 and force the diaphragm downwardly a still greater distance. The arms 38 together with the cylinder 60 are lowered by the diaphragm and the inner end of the bolt 72 will engage the shoulder 75 on the piston 61 and pull said piston downwardly against the tension of the spring 65 and thus open the relief valve 62 whereby fluid will pass out through the upper end of the cap 45.

When pressure has been relieved within the compartment 15 the parts will return to normal position and the relief valve will engage the seat 63 and stop further flow of the fluid from the compartment in this direction. The diaphragm 16 will be returned to normal position by the spring 14 and the fluid from the pipe 40 will flow in the usual manner through the compartment 15 and thence through the outlet pipe 42.

It will be noted that a series of threaded passages 73 are provided in the cylinder 60. When the bolt is in the lowermost passage 73 the device will be more sensitive to pressures and will open at lower pressures. When the bolt is located in one of the higher passages 73 the cylinder 60 must move downwardly a greater distance before the bolt will engage the bottom of the slot to draw the relief valve away from its seat. Therefore when the bolt is so located a greater pressure will be maintained in the compartment 15 before the relief valve will be opened.

It will be seen by the above construction that the arms 38 of the yoke may be slipped downwardly over the pipe 41 and the valve seat 52. The lower ends 37 of the arms may be readily clamped to the flange ring 35 by means of the shouldered head 30 of the bolt 31 when the nut 33 is screwed up tight. All of these parts, however, when released may be withdrawn through the upper section 10 of the housing when the cap 45 has been removed. Furthermore, it is possible to remove the member 60 from its threaded connection with the ring 59 whereby the valve 53 may be readily removed and a new one substituted where the same has been greatly worn.

It will be seen by this construction that all of the parts are removable from the section 10 without disturbing the diaphragm 16 from its connection between the two sections 10 and 13 of the housing.

I claim:

1. A combined relief valve and regulator comprising a housing formed of two sections, an inlet pipe extending into one section and provided with an inlet opening having a valve seat, a yoke straddling the seat, means removably connecting the free ends of the yoke to the diaphragm, a valve holder removably mounted in the upper end of the yoke and provided with a valve engageable with the seat, a spring in the second section forcing the diaphragm, the yoke and valve towards the outer end of the first section, a piston slidably mounted in the holder and provided with a relief valve at its outer end, a relief port adapted to be engaged by the relief valve, a spring within the piston urging the relief valve onto its seat independently of the first-mentioned spring, and means slidably connecting the piston to the valve holder so that the piston may withdraw the relief valve from its seat when the internal pressure in the first section becomes greater than the pressure exerted by the second-mentioned spring, a cap removably closing the outer end of the first section, the valve holder, first-mentioned valve, the relief valve and piston being adapted to be withdrawn as a unit from the first section when the cap is removed without disturbing the inlet pipe and diaphragm.

2. In a combined relief valve and regulator comprising a housing, a diaphragm dividing the housing into two sections, a flanged ring in one section and mounted on the diaphragm, an inlet pipe extending into said section and provided with an inlet opening having a valve seat, a yoke including a ring at one end and arms projecting from said ring and straddling the seat, the free ends of the arms seated within the flanged ring, means clamping the ends of the arms to the flanged ring and for retaining said ring on the diaphragm, a valve holder secured to the ring on the yoke, a valve in the holder engaging the seat, and means in the other section exerting pressure on the diaphragm tending to maintain the valve in open position.

3. In a combined relief valve and regulator comprising a housing, a diaphragm dividing the housing into two sections, a flanged ring in one section and mounted on the diaphragm, an inlet pipe extending into said section and provided with an inlet opening having a valve seat, a yoke including a ring at one end and arms projecting from said ring and straddling the seat, the free ends of the arms being bent inwardly and seated within the flanged ring, a head located in the flanged ring and provided with a shoulder contacting the bent portions of the arms for retaining the ends of said arms in the flanged ring, means securing the head to the diaphragm so that the yoke, head and ring will be moved as a unit by the diaphragm, a valve holder secured to the ring on the yoke, a valve in the holder engaging the seat, and means in the other section exerting pressure on the diaphragm tending to maintain the valve in open position.

JAMES M. WILKINS.